(12) United States Patent
Tateishi et al.

(10) Patent No.: US 9,173,076 B2
(45) Date of Patent: Oct. 27, 2015

(54) AUTHENTICATION METHOD, AUTHENTICATION SYSTEM AND AUTHENTICATION PROGRAM

(71) Applicant: INTERNATIONAL BUSINESS MACHINES CORPORATION, Armonk, NY (US)

(72) Inventors: Takaaki Tateishi, Kanagawa-ken (JP); Yuji Watanabe, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/362,711

(22) PCT Filed: Nov. 8, 2012

(86) PCT No.: PCT/JP2012/078939
§ 371 (c)(1),
(2) Date: Jun. 4, 2014

(87) PCT Pub. No.: WO2013/088867
PCT Pub. Date: Jun. 20, 2013

(65) Prior Publication Data
US 2014/0342701 A1  Nov. 20, 2014

(30) Foreign Application Priority Data
Dec. 13, 2011  (JP) .................... 2011-272709

(51) Int. Cl.
*H04M 3/16* (2006.01)
*H04W 4/12* (2009.01)
(Continued)

(52) U.S. Cl.
CPC ............ *H04W 4/12* (2013.01); *G06F 21/35* (2013.01); *H04W 4/16* (2013.01); *H04W 12/02* (2013.01); *H04W 12/06* (2013.01); *H04W 12/08* (2013.01)

(58) Field of Classification Search
CPC ......... H04W 4/12; H04W 4/16; H04W 12/02; H04W 12/06; H04W 12/00; H04W 12/08; H04W 28/00; H04W 28/02; H04W 28/16
USPC ................ 455/412.1, 414.1, 432.1, 410, 411
See application file for complete search history.

(56) References Cited

U.S. PATENT DOCUMENTS

2006/0258292 A1* 11/2006 Kato et al. ................ 455/67.11
2008/0059051 A1*  3/2008 Kumagai et al. ............ 701/117
(Continued)

FOREIGN PATENT DOCUMENTS

JP  2002-291047 A  10/2002
JP  2003044988  2/2003
(Continued)

OTHER PUBLICATIONS

Rene Mayrhofer and Hans Gellersen, "Shake Well Before Use: Authentication Based on Accelerometer Data", Intl Conf on Pervasive Computing, Lancaster Univ, Compt Dept. 2007.

*Primary Examiner* — Jean Gelin
(74) *Attorney, Agent, or Firm* — Vazken Alexanian

(57) ABSTRACT

A data server to authenticate a passenger anonymously and allow an outside service to provide a service on the basis of this authentication. A passenger in an automobile uses a portable terminal with an acceleration sensor to send the acceleration sensor log in the portable terminal to a data server. The data server calculates the degree of similarity between the acceleration sensor log and time-series data related to acceleration obtained from probe data acquired from the automobile, and verifies that the portable terminal is indeed inside the automobile by confirming that there is a sufficiently high correlation between the log and the time-series data. The data server provides an access permission code to the portable terminal in response to successful acceleration authentication. The portable terminal provides the access permission code to an outside service, and the outside service accesses probe data in the data server using the access permission code.

16 Claims, 11 Drawing Sheets

(51) Int. Cl.

| | | |
|---|---|---|
| *G06F 21/35* | (2013.01) | |
| *H04W 12/02* | (2009.01) | |
| *H04W 4/16* | (2009.01) | |
| *H04W 12/08* | (2009.01) | |
| *H04W 12/06* | (2009.01) | |

(56) References Cited

U.S. PATENT DOCUMENTS

2008/0136670 A1* 6/2008 Tengler et al. ............... 340/905
2009/0076774 A1* 3/2009 Miyajima .................... 702/179
2013/0247117 A1* 9/2013 Yamada et al. ................ 725/93
2014/0052370 A1* 2/2014 Watanabe et al. ............ 701/428
2014/0303892 A1* 10/2014 Morlock ....................... 701/533

FOREIGN PATENT DOCUMENTS

| JP | 2005-092722 A | 4/2005 |
| JP | 2006-208155 | 9/2006 |
| JP | 2006-325080 A | 11/2006 |
| JP | 2007-116318 A | 5/2007 |
| JP | 2009527984 | 7/2009 |
| JP | 2010165306 | 7/2010 |
| JP | 2010-187282 A | 8/2010 |
| JP | 2011-101118 A | 5/2011 |

* cited by examiner

AUTHENTICATION METHOD, AUTHENTICATION SYSTEM AND AUTHENTICATION PROGRAM

CROSS REFERENCE TO RELATED APPLICATION

This application claims priority under 35 U.S.C. 371 from PCT Application, PCT/JP2012/078939, filed on Nov. 8, 2012, which claims priority from the Japanese Patent Application No. 2011-272709, filed on Dec. 13, 2011. The entire contents of both applications are incorporated herein by reference.

BACKGROUND OF THE INVENTION

1. Field of the Invention

The present invention relates to a technique for authenticating a person riding in a vehicle such as an automobile, and more specifically to an authentication technology using an acceleration sensor.

2. Description of the Related Art

In recent years, probe data has been collected from automobiles and telematic services provided using this probe data. Telematics is a system that provides information and services to automobiles using onboard devices such as car navigation devices and mobile communication.

People other than the owner can be inside an automobile, such as friends and family. At this time, there is a desire to provide services to passengers other than the owner of an automobile using probe data from the automobile. However, the data servers of telematic services do not allow service providers to verify that a passenger is inside an automobile.

A passenger can be verified by providing, for example, personal information and a mobile phone number to a data server of a telematic service, but this is undesirable as the privacy of the passenger in the automobile is violated.

Authentication methods using acceleration sensors have been proposed. In Laid-open Patent Publication No. JP 2002-291047, a portable communication terminal with a wireless communication means has been disclosed in which this wireless device includes an acceleration sensor unit for detecting the acceleration of the wireless device and outputting predetermined acceleration signals, a storage unit for storing in advance acceleration signals detected and outputted by the acceleration sensor unit as a password, and a control unit for permitting use of a communication terminal 10 when the acceleration signals outputted from the acceleration sensor unit and the password signals stored in the storage unit match.

In Laid-open Patent Publication No. JP 2005-92722, an operation recognition device has been proposed which includes a portable three-dimensional acceleration sensor for sensing three-dimensional acceleration, a characteristic sample extracting means for extracting a temporal transition in the three-dimensional acceleration detected by the portable three-dimensional acceleration sensor as a characteristic sample, a sample database for holding a reference characteristic sample of three-dimensional acceleration, a matching processing means for matching the characteristic sample extracted by the characteristic sample extracting means to the reference characteristic sample held in the characteristic sample database, and an authentication established signal outputting means for outputting authentication established signals when the matching performed by the matching processing means has been successful.

In Laid-open Patent Publication No. JP 2007-116318, a mobile phone with an acceleration sensor device is combined with an acceleration detecting unit, an acceleration/personal authentication information registering unit, a personal authentication information storing unit and a personal authentication information authenticating unit (14), and this combination is used to authenticate a movement pattern when the mobile phone has moved as personal authentication information, and set and/or release block functions in the mobile phone accordingly.

In Laid-open Patent Publication No. JP 2011-101118, time-series data for detection values detected by various sensor units in an onboard information device and mobile device (position information, acceleration information, etc.) is used as an authentication key for determining whether or not authentication is successful. Because time-series data for detection values from these sensor units is very difficult to acquire outside of an automobile, time-series data for these detection values can be used as an authentication key for authentication between a mobile device carried by a passenger and an onboard information device.

A technique has also been disclosed in which device-to-device authentication is performed by bringing a plurality of devices together. See Rene Mayrhofer and Hans Gellersen, "Shake well before use: Authentication based on accelerometer data", International Conference on Pervasive Computing, 2007.

In the prior art technology mentioned above, even when a data server can authenticate a passenger anonymously, the authentication cannot be provided to a server other than the data server in order to provide an outside service.

Therefore, it is the object of the present invention to enable a data server to authenticate a passenger anonymously and allow an outside service separate from the data server to provide a service on the basis of this authentication.

The present invention has been conceived to solve this problem by providing a system for permitting an outside service used by the user of a portable terminal equipped with an acceleration sensor to access probe data stored in a data server in order to provide a server.

SUMMARY OF THE INVENTION

One aspect of the present invention provides a processing system having a function for collecting probe data from an automobile, the processing system including: a memory, a processor communicatively coupled to the memory; and a data server, communicatively coupled to the memory and the processor. The data server is configured to perform the steps of the method including: receiving an acceleration time-series data from a portable terminal equipped with an acceleration sensor inside the automobile; extracting a time-series data related to the acceleration of the automobile from the probe data; calculating the a degree of similarity between the acceleration time-series data received from the portable terminal and the time-series data related to acceleration in the probe data; generating an authentication code in response to calculating the degree of similarity, wherein the authentication code indicates a degree of similarity equal to or greater than a predetermined level, and for sending the authentication code to the portable terminal; and permitting a server for an outside service to access the probe data in response to receiving the authentication code from a the server system of an the outside service receiving the authentication code from the portable terminal.

A second aspect of the present invention provides a computer-implemented method for a collecting probe data from an automobile, and an outside service for providing a serving using the probe data. The computer-implemented method including: receiving an acceleration time-series data from a portable terminal equipped with an acceleration sensor inside the automobile; extracting a time-series data related to the acceleration of the automobile from the probe data; calculating the a degree of similarity between the acceleration time-series data received from the portable terminal and the time-series data related to acceleration in the probe data; generating an authentication code in response to calculating the degree of similarity, wherein the authentication code indicates a degree of similarity equal to or greater than a predetermined level, and for sending the authentication code to the portable terminal; and permitting a server for an outside service to access the probe data in response to receiving the authentication code from a the server system of an the outside service receiving the authentication code from the portable terminal.

A third aspect of the present invention provides a computer readable non-transitory article of manufacture tangibly embodying computer readable instructions having a function for collecting probe data from an automobile, when executed, cause a computer to carry out the steps of a method as described above.

DETAILED DESCRIPTION OF THE PREFERRED EMBODIMENTS

Figure 1:
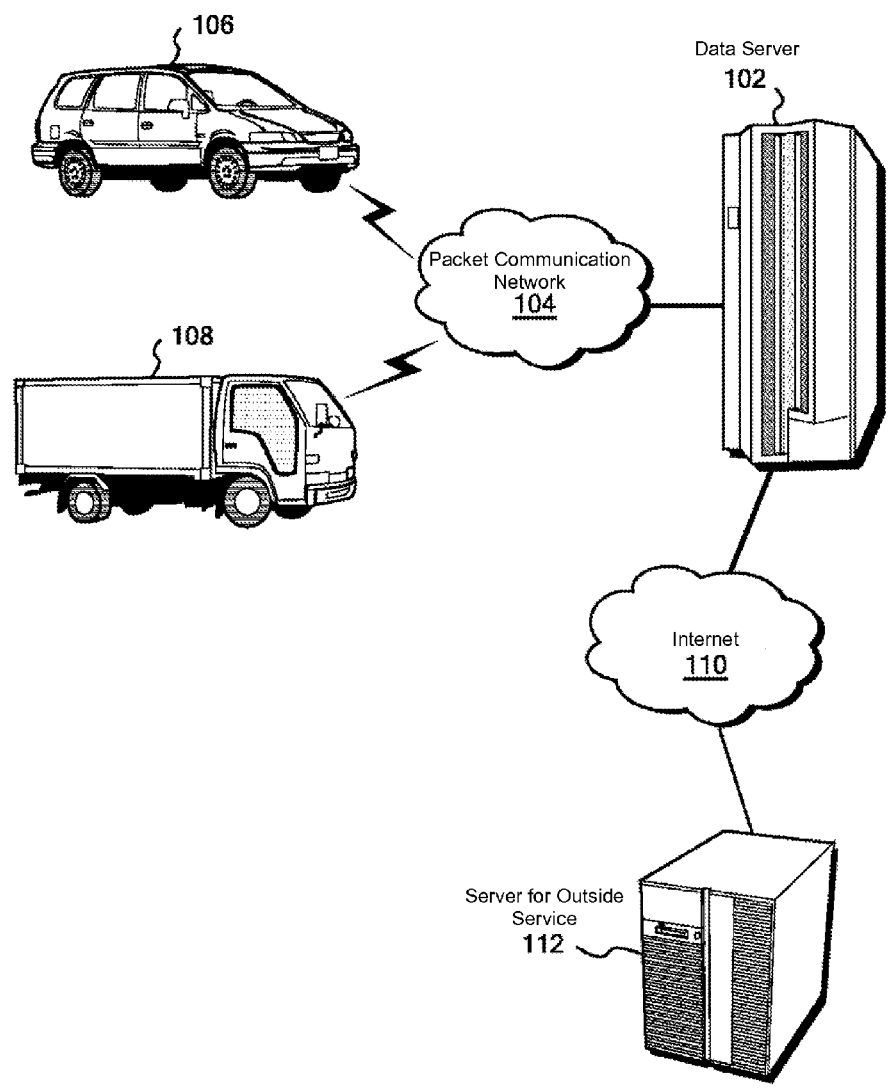
FIG. 1 is a schematic diagram showing a general configuration able to embody the present invention.

The following is an explanation of an example of the present invention with reference to the drawings. In the drawings, identical objects are denoted by the same reference numbers unless otherwise noted. The following explanation is of embodiments of the present invention, and it should be understood that the following explanation is not intended to restrict the present invention to the content explained in the examples.

The present invention is able to allow the user of a portable terminal equipped with an acceleration sensor riding inside an automobile to use an outside service employing probe data collected from the automobile in which the user is riding while also protecting the privacy of the user.

The system in the present invention consists of a data server for receiving probe data from an automobile, and a server of an outside service separate from the data server. The data server has a function for receiving an acceleration sensor log from a portable terminal equipped with an acceleration sensor, an authentication function for calculating the degree of similarity between the acceleration sensor log of the portable terminal and time-series data related to the acceleration data of the automobile obtained from probe data acquired from the automobile and determining whether or not there is sufficiently high correlation between the log and the time-series data, and a function for sending an access permission code to the portable terminal in response to successful authentication by the authentication function.

In this configuration of the present invention, the following processing is performed.

1. A passenger with a portable terminal uses the portable terminal to request a service provided by an outside service using the probe data of the automobile in which the passenger is riding.

2. The outside service provides an authentication screen to the portable terminal in response to the service request.

3. The passenger with the portable terminal uses the portable terminal to send the acceleration sensor log of the portable terminal to a data server using the authentication screen.

4. The data server calculates the degree of similarity between the acceleration log and time-series data related to acceleration obtained from probe data acquired from the automobile, and verifies that the portable terminal, for example, a mobile phone, is inside the automobile when a sufficiently high correlation between the log and the time-series data has been confirmed (acceleration authentication).

5. The data server provides an access permission code to the portable terminal in response to successful acceleration authentication.

6. The portable terminal provides the access permission code to an outside service.

7. The outside service uses the access permission code to access probe data in the data server.

8. The outside service provides a service using the acquired probe data.

FIG. 1 is a schematic diagram showing a general configuration able to embody the present invention. The data server 102 is part of a so-called probe car communication system that collects information from a plurality of automobiles 106, 108 via a packet communication network 104. A probe car system is not limited to the one shown in this example. For example, it can be constructed using the technology disclosed in Laid-open Patent Publication No. JP 2005-4359.

The data server 102 is also connected via the internet 110 to a server 112 of an outside service such as a telematic service. The outside service can, for example, detect whether dangerous driving is occurring based on driving data (acceleration data) in the probe data, and alert an insurance company. When the passenger is riding in a bus, probe data from the bus can be used to provide services to a smart phone (mobile terminal) such as information on the availability of seats and transfer guidance.

Figure 2:
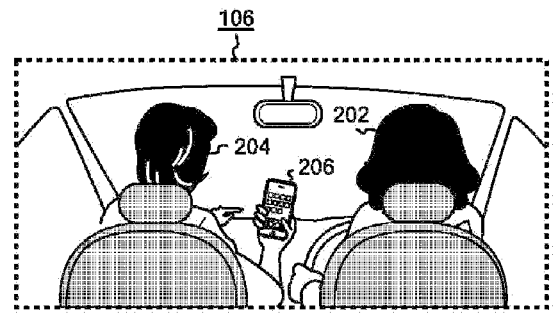
FIG. 2 is a diagram showing a portable terminal being used inside an automobile.

FIG. 2 is a diagram showing a portable terminal being used inside an automobile 106. Here, the driver 202 is the owner of the vehicle 106, and the passenger 204 sitting in the passenger seat is using a portable terminal 206 to access an outside service which uses probe data from the automobile 106. In this example, the passenger 204 wishes to access the outside service anonymously.

The portable terminal 206 includes an acceleration sensor described in Laid-open Patent Publication No. JP 2002-291047, but the present invention is not limited to this example.

Figure 3:
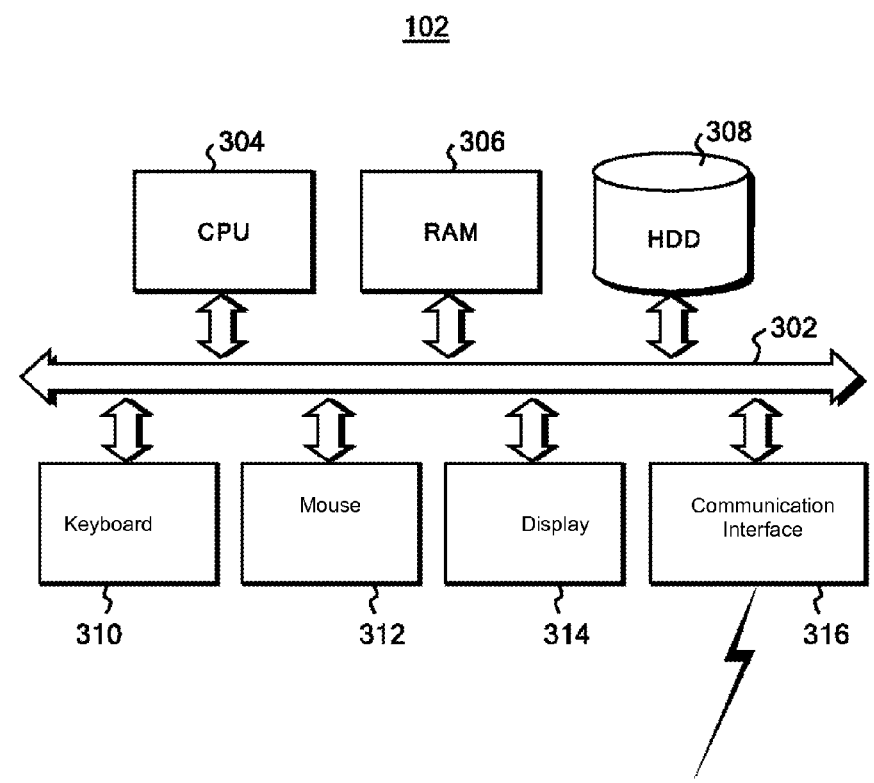
FIG. 3 is a block diagram of the hardware configuration of the data server.

The following is an explanation of the hardware configuration of the data server 102 with reference to the block diagram in FIG. 3. In FIG. 3, a CPU 304, main memory (RAM) 306, a hard disk drive (HDD) 308, a keyboard 310, a mouse 312, and a display 314 are connected to a system bus 302. The CPU 304 is preferably based on a 32-bit or 64-bit architecture. Examples include Pentium (trademark) 4, Core (trademark) 2 Duo and Xeon (trademark) from Intel, and Athlon (trademark) from AMD. The main memory 306 preferably has a capacity of at least 4 GB, and the hard disk drive 308 preferably has a capacity of at least 500 GB.

While none is shown in the drawings, an operating system is stored beforehand on the hard disk drive 308. The operating system should be compatible with the CPU 304. Examples include Linux (trademark), Windows (trademark) 7 and Windows XP (trademark) from Microsoft, and MacOS (trademark) from Apple Computer.

As explained below with reference to FIG. 4, the hard disk drive 308 stores a communication module 404, probe data DB [database] 406, an acceleration matching module 408, a permission code generating module 410, a permission code table 412 and a permission code authenticating module 414. These routines can be created using the processing system for any existing programming language such as C, C++, C# or Java®, and these modules can be downloaded to the main memory 306 and executed by the operating system whenever they are required.

The operator of the data server 102 uses the keyboard 310 and mouse 312 to manipulate a predetermined GUI screen (not shown) to start the modules mentioned above and perform maintenance operations.

The display 314 is preferably a liquid-crystal display, and can have any resolution such as XGA (1024×768 resolution) or UXGA (1600×1200 resolution). The display 314 can be used to display prediction data for the generated results.

The system shown in FIG. 3 is connected to an outside network such as a LAN or WAN via a communication interface 316 connected to the bus 302. The communication interface 316 can be configured using Ethernet (trademark) to exchange data with a data server 102 in an outside network, a server 112 for an outside service, or a system such as a probe car system. This communication interface 316 can also communicate with a portable terminal 206 via a base station (not shown) for portable terminals 206 and the Internet 110.

Figure 4:
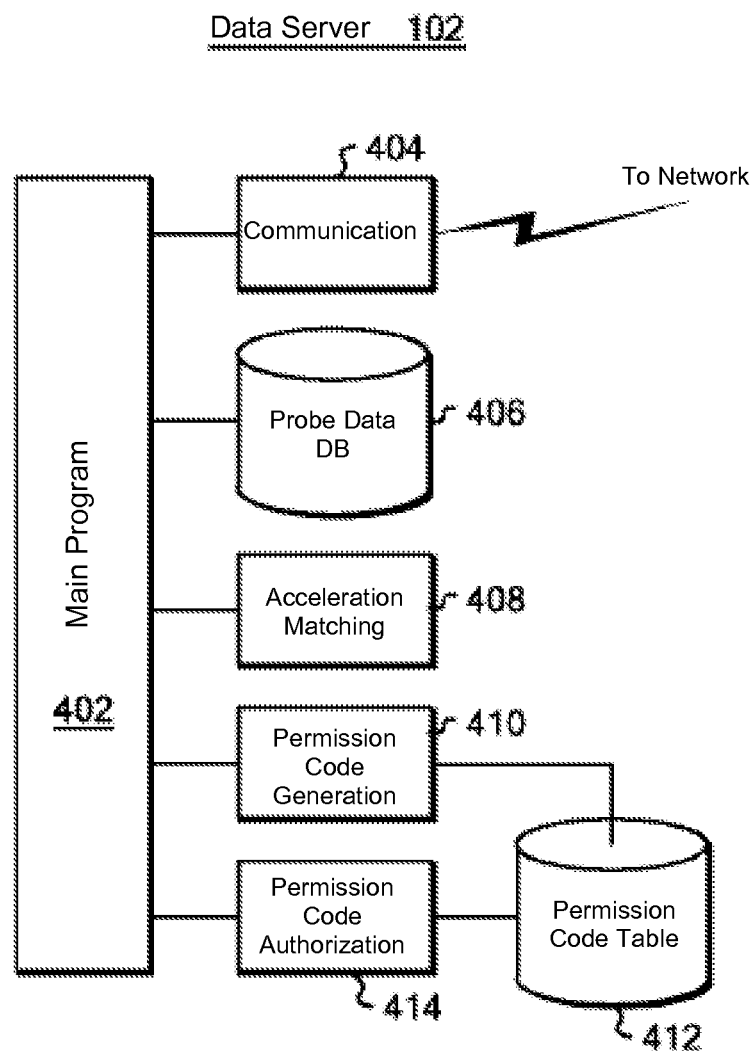
FIG. 4 is a block diagram of the functional configuration of the data server.

FIG. 4 is a function block diagram showing the configuration of the data server 102. The main program 402 has a function which controls the communication module 404, acceleration matching module 408, permission code generating module 410 and permission code authenticating module 414 to perform the desired processing.

The main program 402 receives probe data from a plurality of automobiles via the communication module 404, and stores the probe data from each automobile in the hard disk drive 308 as probe data DB 406. The probe data for each automobile is preferably identified by vehicle identification number (VIN). Acceleration data as well as door opening and closing data are included in the probe data for each automobile.

The main program 402 also receives acceleration data from portable terminals 206 via the communication module 404.

The acceleration matching module 408 calculates the degree of similarity between the acceleration data in a time series included in the probe data and the acceleration data in the corresponding time series received from a portable terminal 206, and determines that the acceleration data matches when the degree of similarity exceeds a predetermined threshold value. There are no particular restrictions on the comparison algorithm for the acceleration data, but an algorithm that can be used is described in Rene Mayrhofer and Hans Gellersen, "Shake well before use: Authentication based on accelerometer data", International Conference on Pervasive Computing, 2007.

The permission code generating module 410 has a function that uses a random-number generating routine and hash functions to generate a permission code. The main program 402 sends the permission code to the portable terminal or stores permission code data returned with a VIN from the portable terminal in a permission code table 412. The permission code table 412 is preferably arranged in the main memory 306 and is retained between sessions.

The permission code authenticating module 414 has a function that authenticates a permission code received from a server 112 for an outside service by contrasting the permission code with the permission codes stored in the permission code table 412.

Figure 5:
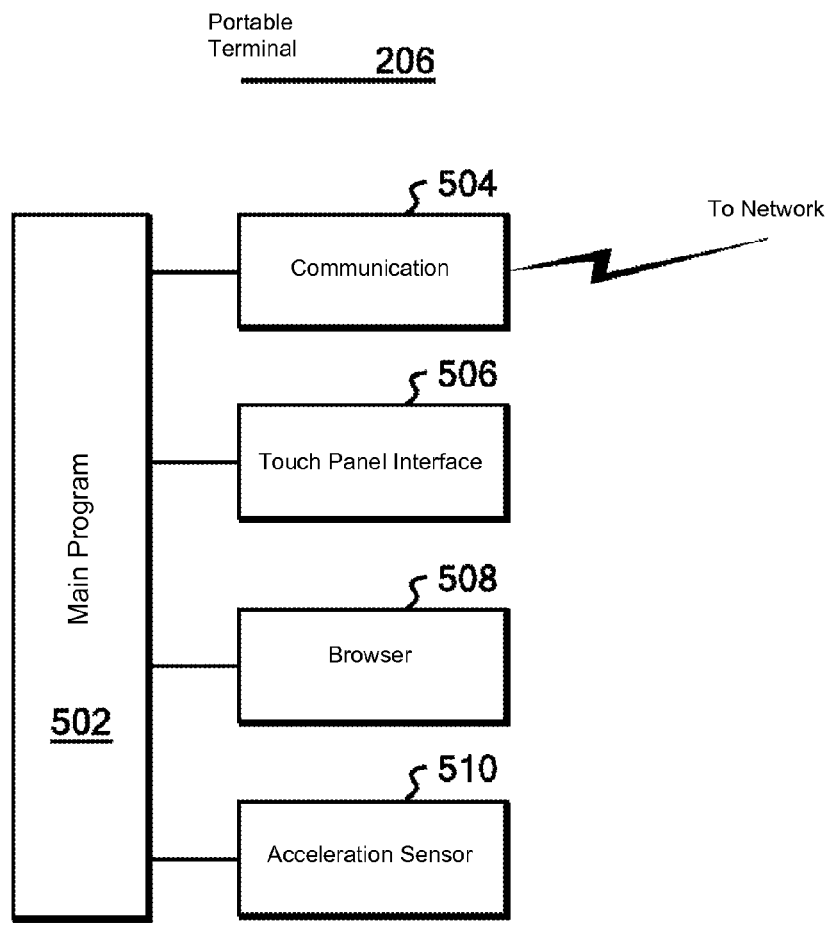
FIG. 5 is a block diagram of the functional configuration of the portable terminal.

FIG. 5 is a block diagram showing the function related to the present invention in a portable terminal 206. The main program 502 has a function for controlling the communication module 504, touch panel interface 506, browser 508 and acceleration sensor 510. The hardware configuration of the portable terminal 206 differs in terms of the CPU architecture, the performance of the operating system and the size of the memory. However, because the configuration is essentially the same as the configuration shown in FIG. 4, illustration and explanation have been omitted.

As the touch panel of the portable terminal 206 is touched with a finger and as a finger is moved across the touch panel, the touch panel interface 506 sends corresponding signals to the main program 502.

The browser 508 is usually the web browser installed in the portable terminal. It is displayed on the touch panel of the portable terminal 206 by manipulating the touch panel interface 506, and has a function for accessing and displaying web pages on the Internet via the communication module 504. More specifically, the role of the browser 508 is to display files written in HTML sent from the data server 102 or server 112 for the outside service when prompted by a user (passenger) operation.

The acceleration sensor 510 has a function for registering the acceleration of the portable terminal 206 in a time series. When a passenger with a portable terminal 206 is riding in an automobile, the acceleration registered in the portable terminal 206 is a synthesis of the acceleration of the automobile and acceleration caused, for example, by movement of the passenger's hand. The main program 502 has a function for sending acceleration time-series data to the data server 102 in response to a passenger permission-granting operation when a request is received from the data server 102. There are no particular restrictions on the acceleration sensor 510, but the acceleration sensor described in Laid-open Patent Publication No. 2002-291047 and mentioned above can be used.

Figure 6:
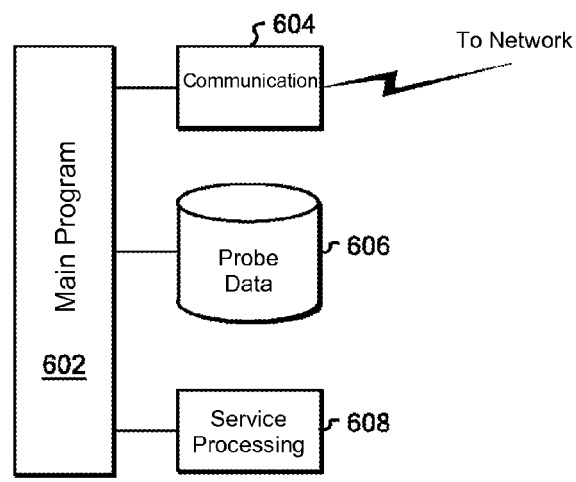
FIG. 6 is a block diagram of the functional configuration of the outside service.

FIG. 6 is a function block diagram showing the functions related to the present invention in a server 112 for an outside service. The main program 602 has a function for controlling the communication module 604 and the routine 608 for service processing. The hardware configuration of the server 112 for the outside service is essentially the same as the configuration shown in FIG. 4 so illustration has been omitted.

The server 112 for an outside service preferably retains probe data sent from the data server 102 as files 606 in the hard disk drive (not shown) of the server 112.

Figure 7:
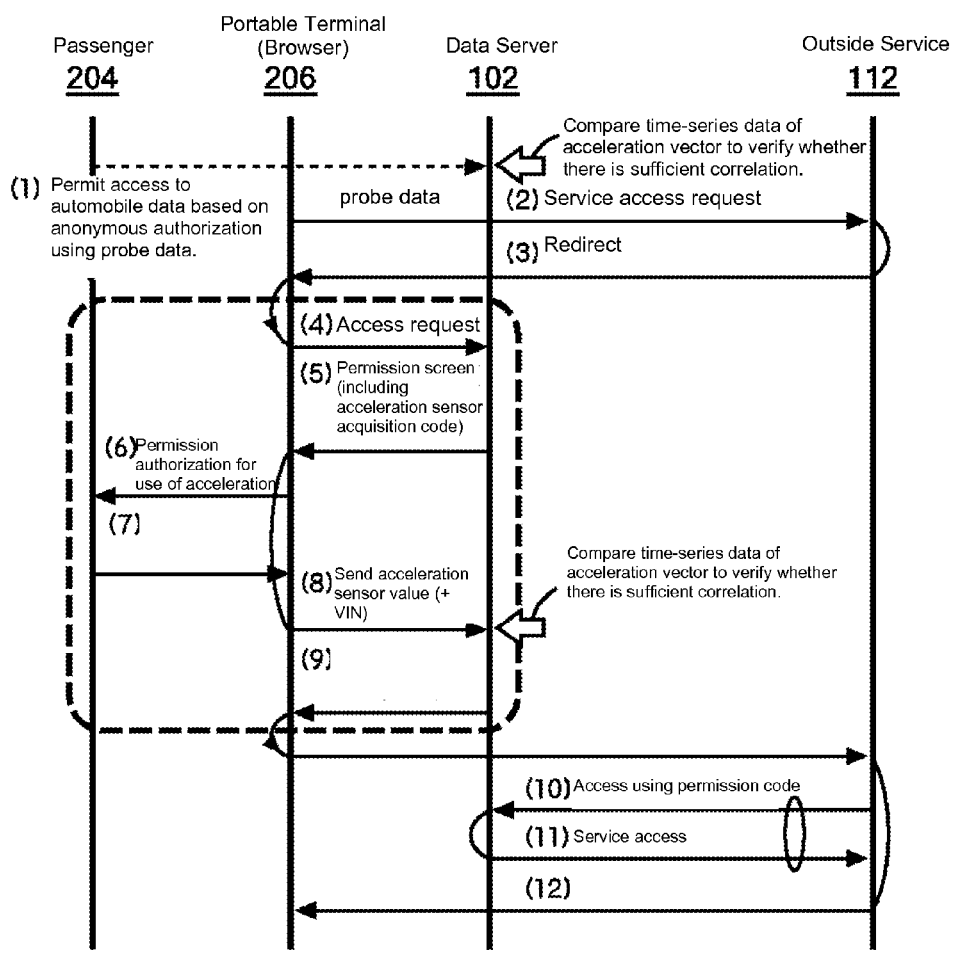
FIG. 7 is a diagram outlining all of the processing performed in the present invention.

The following is an explanation outlining all of the processing performed in the present invention with reference to FIG. 7. This processing is related to the passenger 204 in an automobile 106, the portable terminal 206 held by the passenger 204, the data server 102, and a server 112 for an outside service. The server 112 for the outside service is referred to below simply as the outside service 112.

As shown in FIG. 7, the processing performed in the present invention proceeds as follows.

(1) The passenger 204 indicates the intention to allow access to vehicle data through anonymous authentication using probe data.

(2) More specifically, the passenger 204 indicates this intention by sending a service access request to the outside service 112 using the browser 508 in the portable terminal 206.

(3) In response to this operation, the outside service 112 redirects the access request for probe data to the portable terminal 206.

(4) In response, the browser 508 in the portable terminal 206 sends the access request to the data server 102.

(5) In response, the data server 102 sends an HTML file to the portable terminal 206 for displaying a screen to acquire data from the acceleration sensor.

(6) This screen includes a menu for confirming permission to use acceleration data.

(7) The passenger 204 confirms permission to use acceleration data along with the VIN of the automobile in which the passenger is riding.

(8) The portable terminal 206 then sends sensor values from the acceleration sensor 510 and the VIN to the data server 102.

(9) The data server 102 compares the time-series data for the acceleration sensor sent from the portable terminal 206 to the data sent as probe data corresponding to the VIN, and sends a permission code to the portable terminal 206 when these indicate a match at a certain level.

(10) The portable terminal 206 sends the permission code to the outside service 112. The outside service 112 then uses the permission code to access the data server 102.

(11) In response to access using the permission code, the data server 102 sends probe data to the outside service 112.

(12) The outside service 112 provides a service to the portable terminal 206 based on probe data acquired from the data server 102.

Figure 8:
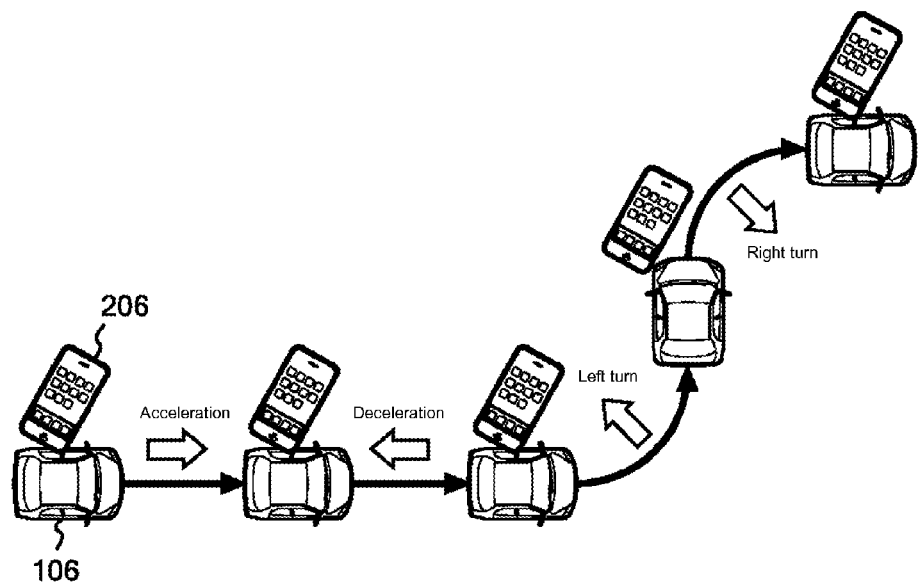
FIG. 8 is a diagram showing the relationship between an automobile and a portable terminal equipped with an acceleration sensor held by a passenger of the automobile.

FIG. 8 is a diagram used to explain the measurement of acceleration using the acceleration sensor in the portable terminal 206.

The following things hold.

First, the positional relationship between the automobile 106 and the portable terminal 206 is not constant. This is because the user is moving.

Next, the absolute value of the acceleration is determined using the acceleration sensor. The automobile 106 has a two-axis accelerometer, and the portable terminal 206 has a three-axis accelerometer.

The absolute value of the acceleration and changes in direction are grasped (forward, stop, left turn, right turn, etc.). A change in acceleration of the automobile 106 changes the acceleration of the portable terminal. This is better understood by referring to FIG. 8. In other words, acceleration, deceleration, left turn acceleration and right turn acceleration of the automobile 106 are also applied to the portable terminal 206. Because the acceleration is sent from the portable terminal 206 in real time, it is difficult to forge.

The presence of the owner of the portable terminal 206 inside a vehicle is verified when a sufficient correlation has been established with respect to the absolute values in an acceleration time series of a certain length and changes in direction.

The following is a more detailed explanation with reference to FIG. 9 through FIG. 13 of the individual steps in the overall flowchart shown in FIG. 7.

Figure 9:
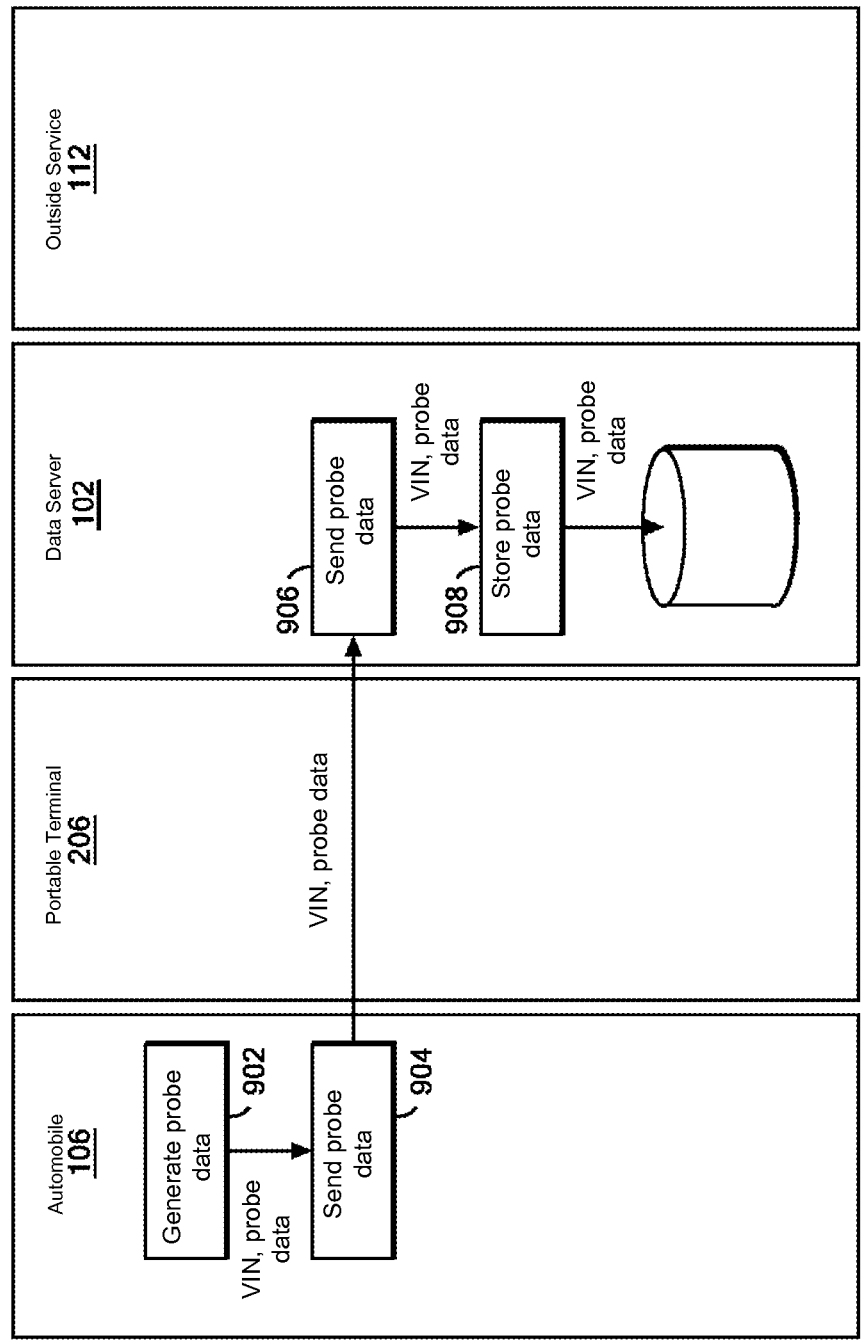
FIG. 9 is a flowchart of the process of collecting probe data.

First, FIG. 9 is a flowchart of the process of collecting probe data. In Step 902, the automobile (vehicle) 106 generates probe data. In Step 904, the probe data and VIN are sent to the data server 102.

In Step 906, the data server 102 receives the probe data and the VIN. In Step 908, the probe data and the VIN are stored in the probe data DB 406.

Figure 10:
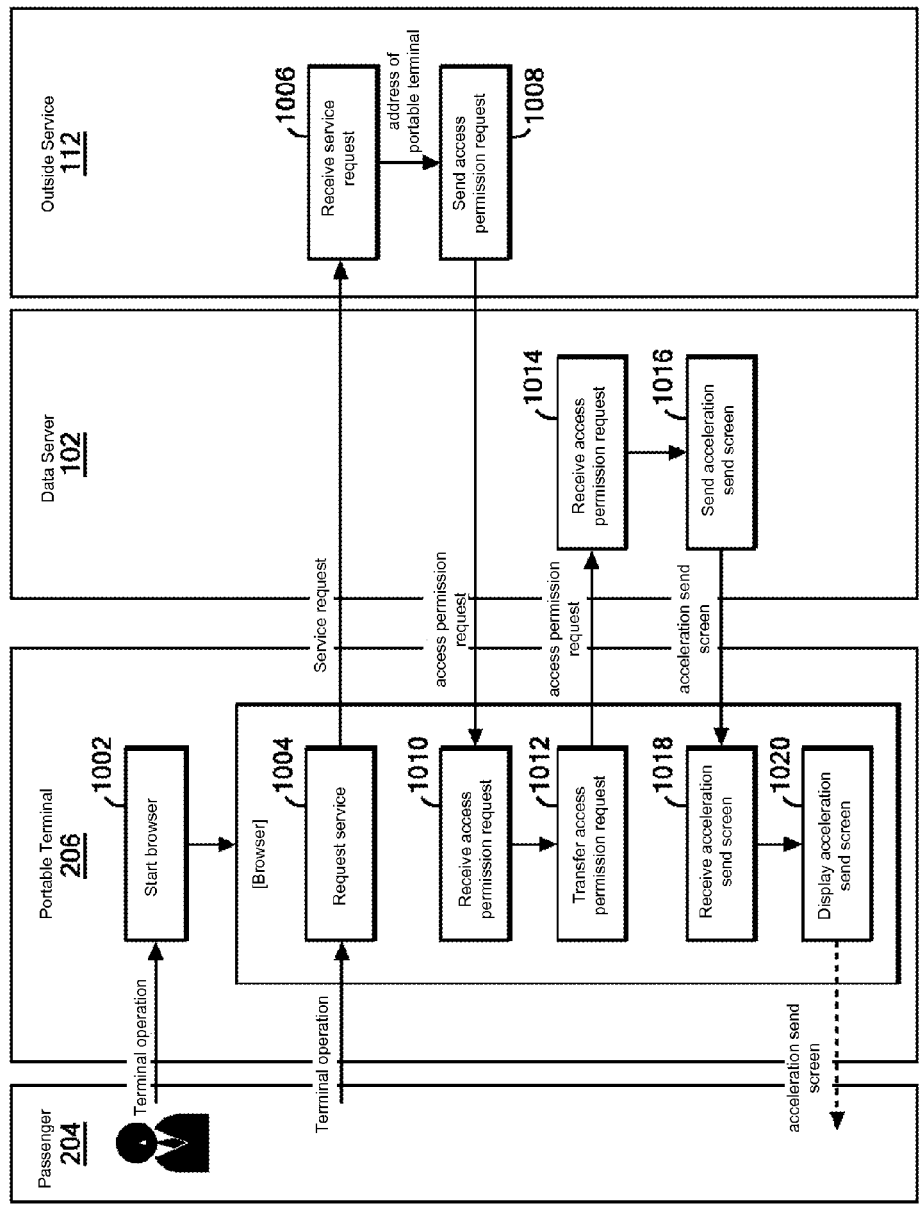
FIG. 10 is a flowchart of the processing performed from a service request to the display of the acceleration send screen.

FIG. 10 is a flowchart of the processing performed from a service request to the display of the acceleration send screen. In Step 1002 of FIG. 10, the passenger 204 operates the portable terminal 206 using the touch panel, and the browser 508 is started.

When the browser 508 is started, the passenger 204 manipulates the screen on the browser 508 to call up the screen of the desired outside service 112. In Step 1004, a service request is sent to the outside service 112.

In Step 1006, the outside service 112 receives the service request from the browser 508. In Step 1008, the address of the portable terminal 206 is used to send an access permission request to the portable terminal 206.

In Step 1010, the portable terminal 206 receives the access permission request from the outside service 112. In Step 1012, the access permission request is transferred to the data server 102.

In Step 1014, the data server 102 receives the access permission request. In Step 1016, the acceleration send screen is sent to the portable terminal 206.

In Step 1018, the portable terminal 206 receives the acceleration send screen. In Step 1020, the screen is displayed on the browser.

Figure 11:
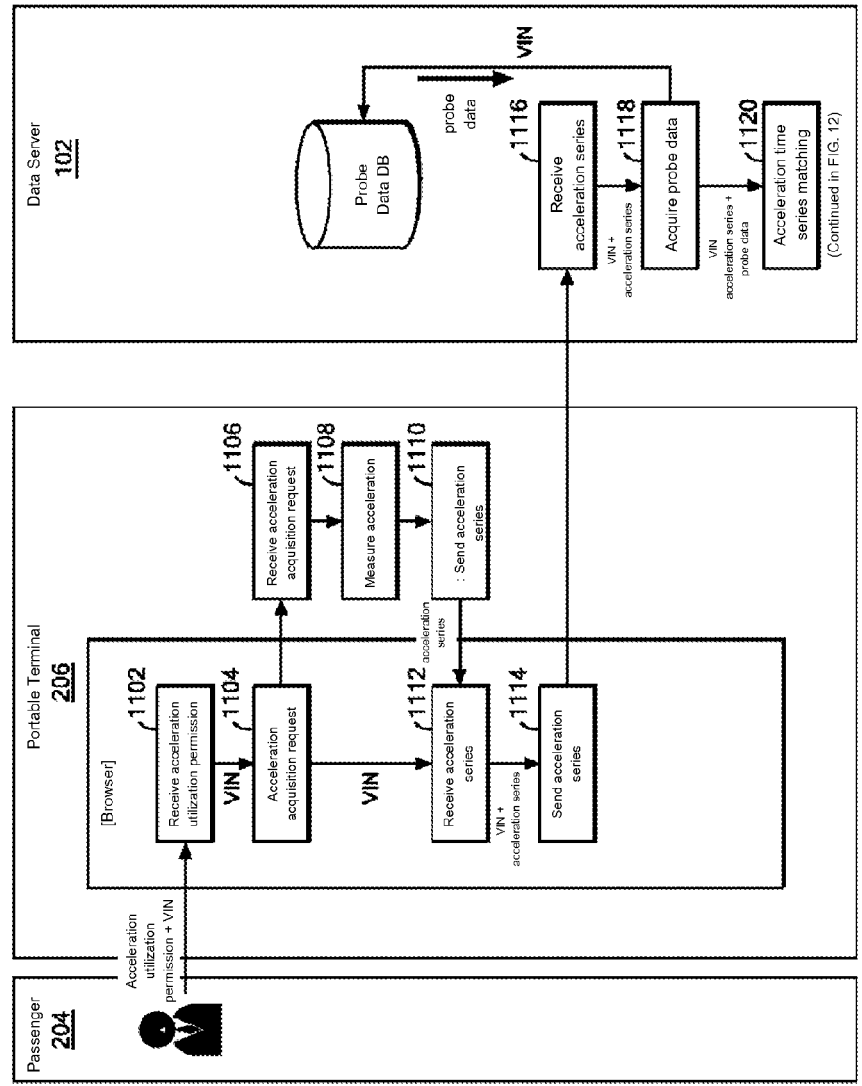
FIG. 11 is a flowchart of the processing performed from the input of acceleration utilization permission to acceleration time-series matching.

FIG. 11 is a flowchart of the processing performed from the input of acceleration utilization permission to acceleration time-series matching. In Step 1102, the passenger 206 views the acceleration send screen on the browser, gives permission to use acceleration data, and enters the VIN. Here, the passenger 204 can elect not to permit the use of acceleration data. In other words, the passenger can abort the process.

In Step 1102, the passenger 204 inputs the VIN and permits use of acceleration data. In Step 1104, the browser sends an acceleration data acquisition request to the acceleration sensor 510.

In Step 1106, the acceleration sensor 510 receives the acceleration data acquisition request. In Step 1108, the acceleration sensor 510 measures the acceleration for a predetermined period of time. In Step 1110, an acceleration time series is sent to the browser.

In Step 1112, the acceleration time series is received from the acceleration sensor 510. In Step 1114, the acceleration time series and the VIN are sent to the data server 102.

In Step 1116, the data server 102 receives the acceleration time series. In Step 1118, the probe data corresponding to the VIN is acquired from the probe data DB 406.

In Step 1120, the acceleration matching module 408 in the data server 102 compares the acceleration time series received from the portable terminal 206 to the acceleration time series included in the probe data. The preferred comparison algorithm is the algorithm described in Rene Mayrhofer and Hans Gellersen, "Shake well before use: Authentication based on accelerometer data", International Conference on Pervasive Computing, 2007. However, the present invention is not limited to this example. Any existing valid technique can be used, such as the technique described in Laid-open Patent Publication No. JP 2011-101118.

Figure 12:
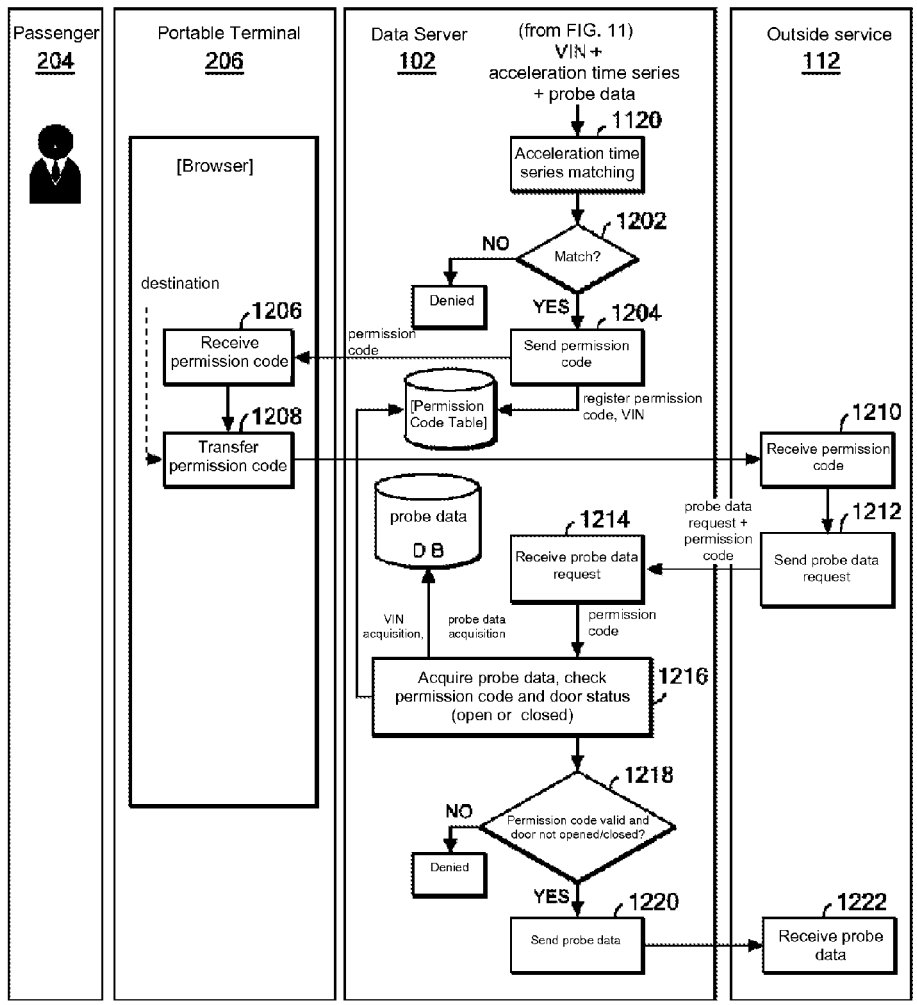
FIG. 12 is a flowchart of the processing performed from acceleration time-series matching to reception of probe data.

FIG. 12 is a flowchart of the processing performed from acceleration time-series matching to reception of probe data. Step 1120 in FIG. 12 is a continuation from FIG. 11.

In Step 1120, the acceleration matching module 408 determines whether or not the acceleration time series match is within a predetermined acceptable range. If the module accepts the match, in Step 1204, the data server 102 generates a permission code using the permission code generating module 410, and the generated permission code is sent to the portable terminal 206. The permission code is written to the permission code table 412 along with the VIN. If the acceleration matching module 408 denies a match, the process is ended.

In Step 1206, the browser of the portable terminal 206 receives the permission code. In Step 1208, the permission code is sent to the outside service 112.

In Step 1210, the outside service 112 receives the permission code. In Step 1212, a probe data request is sent along with the permission code to the data server 102.

In Step 1214, the data server 102 receives the permission code and the probe data request from the outside service 112. In Step 1216, the permission code authenticating module 414 uses the permission code to search the permission code table 412 and acquire the VIN. If the permission code cannot be found in the permission code table 412, the permission code is rejected and the process is ended.

When the VIN is acquired in Step 1216, the data server 102 acquires probe data from the probe data DB 406 based on the VIN.

In Step 1218, the data server 102 verifies whether a door opening and closing event has occurred in the acquired probe data. If a door opening and closing event has occurred, access is denied and the process ends.

When it has been verified that a door opening and closing event has not occurred in the acquired probe data, probe data is sent to the outside service 112 in Step 1220. In this example, it is assumed that the passenger can have changed when a door opening and closing event has occurred. Preferably, when a door opening and closing event occurs, the process returns to Step 1016 (FIG. 10) and another authentication request is made. The process can also be resumed from the service request in Step 1004.

Figure 13:
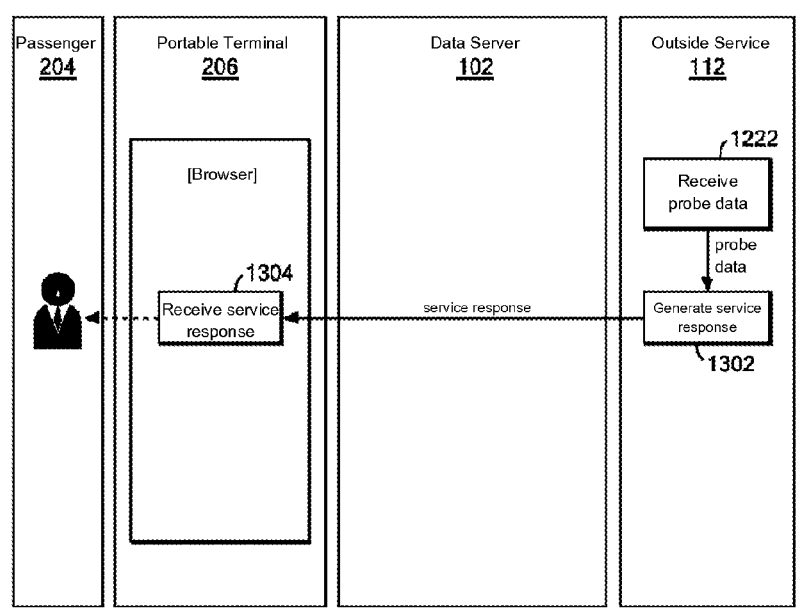
FIG. 13 is a flowchart of the processing performed from reception of probe data to reception of a service reply.

In Step 1222, the outside service 112 receives probe data from the data server 102. FIG. 13 is a flowchart of the processing performed from reception of probe data to reception of a service reply. Step 1222 in FIG. 13 is continued from FIG. 12.

When probe data is received in Step 1222, the outside service 112 generates a service request in Step 1302 and sends the service request to the portable terminal 206.

In Step 1304, the portable terminal 206 receives the service request from the outside service 112. The service request is displayed on the browser of the portable terminal 206 so the passenger 204 can view the browser of the portable terminal 206 and use the service request.

The present invention was explained above with reference to specific examples. It should be understood that the present invention is by no means limited to these specific examples, and that many variations are included in the scope of rights for the present invention. For instances, there is only one outside service in the example shown in the drawings. However, a plurality of outside services can be available, and these outside services can use the probe data in many different ways.

The invention claimed is:

1. A processing system having a function for collecting probe data from an automobile, the processing system comprising:
   a memory;
   a processor communicatively coupled to the memory; and
   a data server, communicatively coupled to the memory and the processor, further comprising:
   means for receiving acceleration time-series data from a portable terminal equipped with an acceleration sensor inside the automobile;
   means for extracting time-series data related to the acceleration of the automobile from the collected probe data;
   means for calculating a degree of similarity between the acceleration time-series data received from the portable terminal and the time-series data related to acceleration in the probe data;
   means for generating an authentication code in response to calculation results from the means for calculating the degree of similarity indicating a degree of similarity equal to or greater than a predetermined level, and for sending the authentication code to the portable terminal; and
   means for permitting a server for an outside service to access the probe data in response to receiving the authentication code from the server system of the outside having received the authentication code from the portable terminal.

2. The processing system of claim 1, wherein the means for calculating the degree of similarity calculates the degree of similarity using an absolute value of the acceleration and a direction of the acceleration.

3. The processing system of claim 1, wherein the means for receiving the acceleration time-series data further comprises:
   an authentication code storing means for receiving a VIN of the automobile from the portable terminal and for associating the authentication code with the VIN;
   means for searching for the authentication code in the authentication code storing means in response to receiving the authentication code from the server system of the outside service; and
   means for accessing the probe data corresponding to the VIN associated with the authentication code in search results that are found.

4. The processing system of claim 1, further comprising means for aborting the process in response to the probe data including a door opening and a closing event.

5. The processing system of claim 1, further comprising means for resuming the process for receiving the acceleration time-series data from the portable terminal equipped with an acceleration sensor inside the automobile in response to the probe data including a door opening and a closing event.

6. A computer-implemented method for collecting probe data from an automobile, and an outside service for providing a serving using the probe data, the computer-implemented method comprising:
   receiving, by a data server system, an acceleration time-series data from a portable terminal equipped with an acceleration sensor inside an automobile;
   extracting, by the data server system, a time-series data related to the acceleration of the automobile from the probe data;
   calculating, by the data server system, the degree of similarity between the acceleration time-series data received from the portable terminal and the time-series data related to acceleration in the probe data;

generating, by the data server system, an authentication code in response to calculating the degree of similarity, wherein the authentication code indicates a degree of similarity equal to or greater than a predetermined level, and sending the authentication code to the portable terminal;

sending, by a server system of the outside service, the authentication code to the data server system in response to receiving the authentication code from the portable terminal; and permitting, by the data server system, the server system of the outside service to access the probe data in response to the server system of the outside service having received the authentication code from the portable terminal.

7. The method of claim 6, wherein the degree of similarity is calculated using an absolute value of the acceleration and a direction of the acceleration.

8. The method of claim 6, wherein the server system for the outside service further comprises providing an authentication screen to the portable terminal in response to receiving a service request from the portable terminal, and wherein the portable terminal sends the acceleration time-series data to the data server system via the authentication screen.

9. The method of claim 6, wherein receiving the acceleration time-series data further comprises:
  receiving a VIN of the automobile from the portable terminal and associating the authentication code with the VIN;
  searching for the authentication code in the authentication code storing means in response to receiving the authentication code from the server system of the outside service; and
  accessing the probe data corresponding to the VIN associated with the authentication code in search results that are found.

10. The method of claim 6, further comprising aborting the method in response to the probe data including a door opening and a closing event.

11. The method of claim 6, further comprising resuming the method for receiving the acceleration time-series data from the portable terminal equipped with an acceleration sensor inside the automobile in response to the probe data including a door opening and a closing event.

12. A computer readable non-transitory article of manufacture tangibly embodying computer readable instructions which, when executed, cause a computer to carry out the steps of a method for collecting probe data from an automobile, the method comprising:
  receiving an acceleration time-series data from a portable terminal equipped with an acceleration sensor inside an automobile;
  extracting a time-series data related to the acceleration of the automobile from the collected probe data;
  calculating a degree of similarity between the acceleration time-series data received from the portable terminal and the time-series data related to acceleration in the probe data;
  generating an authentication code in response to calculation results from the calculating the degree of similarity, wherein the authentication code indicates the degree of similarity equal to or greater than a predetermined level, and sending the authentication code to the portable terminal; and
  permitting a server system of an outside service to access the probe data in response to receiving the authentication code from the server system of the outside service having received the authentication code from the portable terminal.

13. The computer of claim 12, wherein the degree of similarity is calculated using an absolute value of the acceleration and direction of the acceleration.

14. The computer of claim 12, wherein receiving the acceleration time-series data further comprises:
  receiving the VIN of the automobile from the portable terminal and associating the generated authentication code with the VIN;
  searching for the authentication code in the authentication code storing means in response to receiving the authentication code from the server system of the outside service; and
  accessing the probe data corresponding to the VIN associated with the authentication code in the found search results.

15. The computer of claim 12, further comprising aborting the method in response to the probe data including a door opening and a closing event.

16. The computer of claim 12, further comprising resuming the method for receiving the acceleration time-series data from the portable terminal equipped with an acceleration sensor inside the automobile in response to the probe data including a door opening and a closing event.

* * * * *